(12) United States Patent
Yajima et al.

(10) Patent No.: US 7,770,700 B2
(45) Date of Patent: Aug. 10, 2010

(54) BRAKE APPARATUS FOR LINEAR MOTOR AND METHOD FOR POSITIONING MOVABLE SECTION OF LINEAR MOTOR

(75) Inventors: Hisashi Yajima, Tsukuba-gun (JP); Nobohiro Fujiwara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 1201 days.

(21) Appl. No.: 11/362,173

(22) Filed: Feb. 27, 2006

(65) Prior Publication Data

US 2006/0237268 A1    Oct. 26, 2006

(30) Foreign Application Priority Data

Apr. 26, 2005   (JP)   ............................. 2005-127820

(51) Int. Cl.
*F16D 65/21* (2006.01)
*A47H 5/02* (2006.01)
(52) U.S. Cl. ........................................ 188/267; 188/67
(58) Field of Classification Search ......... 188/156–164, 188/171, 67, 267; 310/12, 77
See application file for complete search history.

(56) References Cited

U.S. PATENT DOCUMENTS 5,547,059 A    8/1996   Watanabe et al.
5,626,082 A    5/1997   Nozaki
5,950,773 A    9/1999   Ito
2004/0099492 A1    5/2004   Onuki et al.

FOREIGN PATENT DOCUMENTS

| JP | 51-121718 | 10/1976 |
|---|---|---|
| JP | 61-63988 | 5/1986 |
| JP | 61-117590 | 7/1986 |
| JP | 62-193551 | 8/1987 |
| JP | 06-197512 | 7/1994 |
| JP | 8-251904 | 9/1996 |
| JP | 8-317624 | 11/1996 |
| JP | 10-89357 | 4/1998 |
| JP | 11-4508 | 1/1999 |
| JP | 11-82564 | 3/1999 |
| JP | 11-201200 | 7/1999 |
| JP | 2000-184686 | 6/2000 |
| TW | 204327 | 4/1993 |
| TW | I222261 | 10/2004 |

*Primary Examiner*—Christopher P Schwartz
(74) *Attorney, Agent, or Firm*—Paul A. Guss

(57) ABSTRACT

When respective magnetic fluxes are generated by coils and pass through a plate spring, an electromagnetic force, which results from the magnetic flux, is generated within a plate spring, screws, and a magnetic flux-passing member. Therefore, a brake pad is separated from a slide table in accordance with an action of the electromagnetic force exerted against a resilient force of the plate spring. On the other hand, when generation of respective magnetic fluxes from the coils is halted, the electromagnetic force is extinguished, and thus the brake pad presses against the slide table, in accordance with an action of the resilient force of the plate spring.

12 Claims, 6 Drawing Sheets

BRAKE APPARATUS FOR LINEAR MOTOR AND METHOD FOR POSITIONING MOVABLE SECTION OF LINEAR MOTOR

BACKGROUND OF THE INVENTION

1. Field of the Invention

The present invention relates to a brake apparatus for a linear motor, which is used for positioning a movable section of the linear motor with respect to a fixed section of the linear motor, and to a method for positioning the movable section.

2. Description of the Related Art

A linear motor comprises a coil arranged on any one of a movable section and a fixed section thereof, and as necessary, a permanent magnet is arranged on the other of the movable section and the fixed section, so that the permanent magnet is opposed to the coil. The movable section is displaced with respect to the fixed section by means of a thrusting force, which is generated on the basis of Fleming's left hand rule when a current flows through the coil. In this arrangement, a brake apparatus is arranged for the movable section. When electric power supplied to the coil is halted, or when the movable section is displaced to a predetermined position, the movable section is positioned at a predetermined position with respect to the fixed section by actuating the brake apparatus (see Japanese Laid-Open Patent Publication Nos. 2000-184686 and 8-251904).

In the case of the brake apparatus disclosed in Japanese Laid-Open Patent Publication No. 2000-184686, an electromagnet and a brake pad are attached on a side portion of the movable member by means of a plate-shaped member, while a brake base, which is opposed to the electromagnet and brake pad, is arranged on a side portion of the fixed section opposed to the side portion of the movable section. In this arrangement, when electric power applied to the electromagnet is halted, the brake pad presses the brake base by an urging force of a coil spring, which is arranged between the electromagnet and the brake pad. Therefore, the movable section is positioned at a predetermined position with respect to the fixed section.

In the case of the brake apparatus disclosed in Japanese Laid-Open Patent Publication No. 8-251904, a plate-shaped member extends from a side portion of the movable section along a side portion of the fixed section. An electromagnet, which is opposed to the side portion of the fixed section, is arranged at a forward end of the plate-shaped member. With this arrangement, when electric power applied to the electromagnet is stopped, the electromagnet presses the side portion of the fixed section using a permanent magnet, and by means of an electromagnetic force resulting from a magnetic flux from the permanent magnet attached to the forward end of the electromagnet. As a result, the movable section is positioned at a predetermined position with respect to the fixed section.

Recently, for a linear motor, it is required that precise positioning be performed, for example, to an extent of not more than 1 μm. In order to achieve highly accurate positioning as described above, it is necessary that the movable section of the linear motor be correctly positioned with respect to the fixed section using a brake apparatus. For this purpose, backlash between the brake pad and the fixing member therefor must be decreased to be as small as possible, and further, backlash and positional deviation between the brake pad and the movable section should be suppressed to be as small as possible.

However, in the case of the brake apparatus disclosed in Japanese Laid-Open Patent Publication No. 2000-184686, play between the brake pad and the fixing member results in backlash, and it is impossible to position the movable section with respect to the fixed section at an accuracy of not more than 1 μm as described above. On the other hand, in the case of the brake apparatus disclosed in Japanese Laid-Open Patent Publication No. 8-251904, the plate spring for supporting the electromagnet is not rigidly secured, even though the electromagnet and the brake pad are integrated into one unit. Therefore, when the movable section is positioned with respect to the fixed section, it is impossible to avoid positional deviation of the movable section with respect to the brake apparatus. Further, in the case of the brake apparatuses disclosed in Japanese Laid-Open Patent Publication Nos. 2000-184686 and 8-251904, the brake pad is not rigidly secured. Therefore, a problem arises in that the movable section, once positioned, may undergo positional deviation due to deformations of the brake pad, even after the movable section has been positioned with respect to the fixed section.

SUMMARY OF THE INVENTION

An object of the present invention is to provide a brake apparatus for a linear motor, which makes it possible to accurately position a movable section with respect to a fixed section, and further, which makes it possible to reliably avoid positional deviations of the positioned movable section. The present invention also provides a method for positioning the movable section of the linear motor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
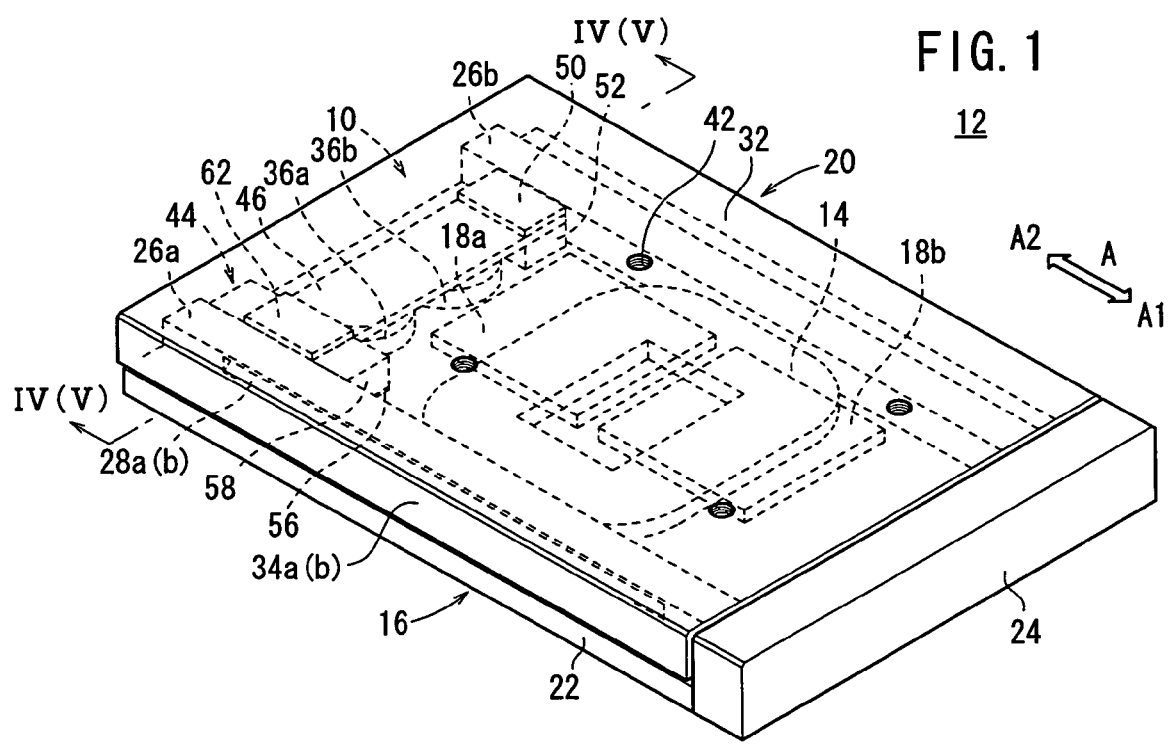
FIG. 1 shows a perspective view illustrating a linear motor provided with a brake apparatus according to an embodiment of the present invention.
Figure 2:
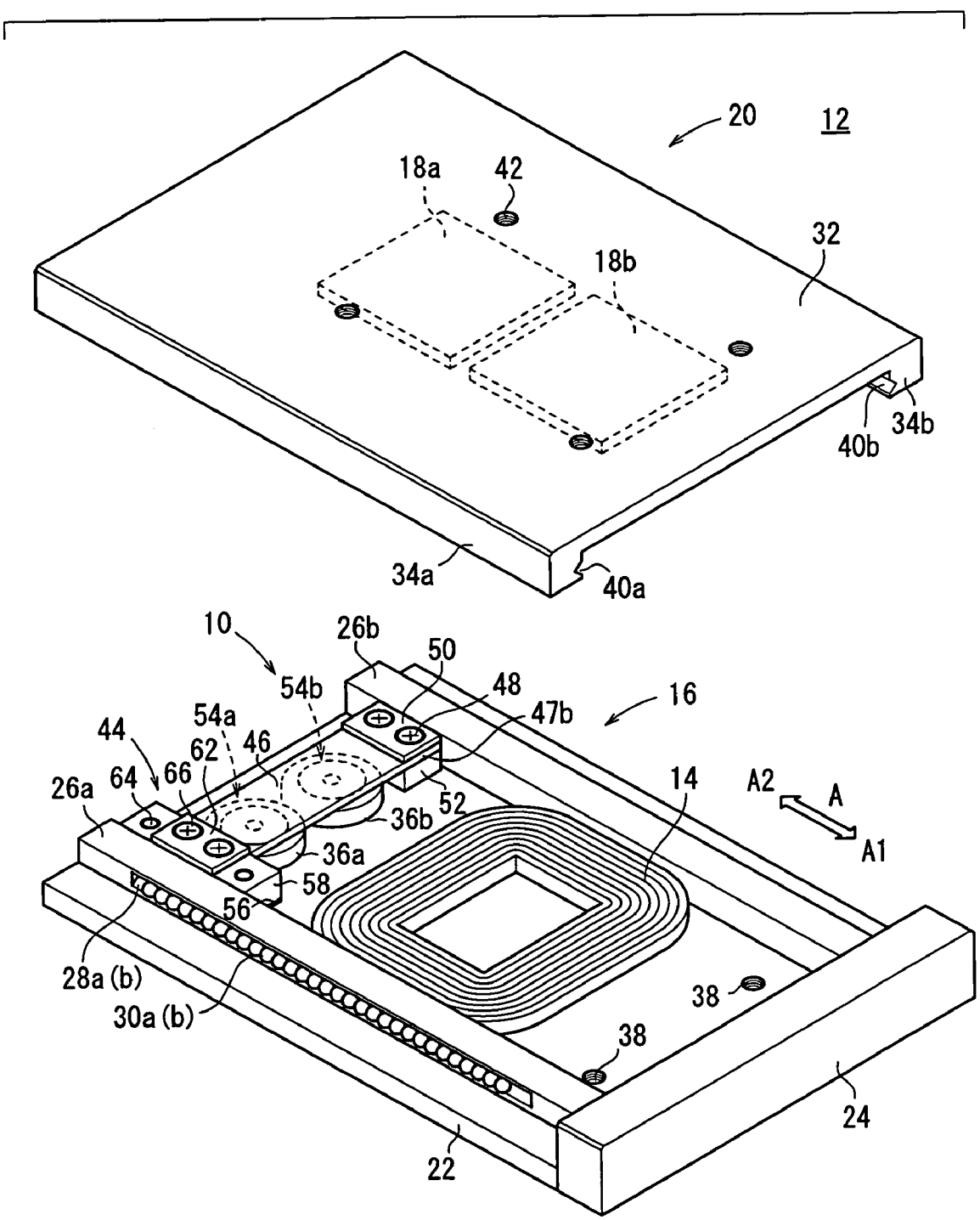
FIG. 2 shows an exploded perspective view illustrating the linear motor shown in FIG. 1.

As shown in FIGS. 1 and 2, a linear motor 12, which has a brake apparatus 10 for the linear motor according to an embodiment of the present invention (hereinafter also referred to as "brake apparatus 10"), comprises a fixed section 16 provided with a coil 14, and a movable section 20 provided with two permanent magnets 18a, 18b arranged opposingly to the coil 14.

As shown in FIGS. 1 to 5, the fixed section 16 includes a guide rail 22, the coil 14 which is arranged at a substantially central portion on an upper surface of the guide rail 22, and a driving section 24 which contains an unillustrated electronic circuit.

Figure 3:
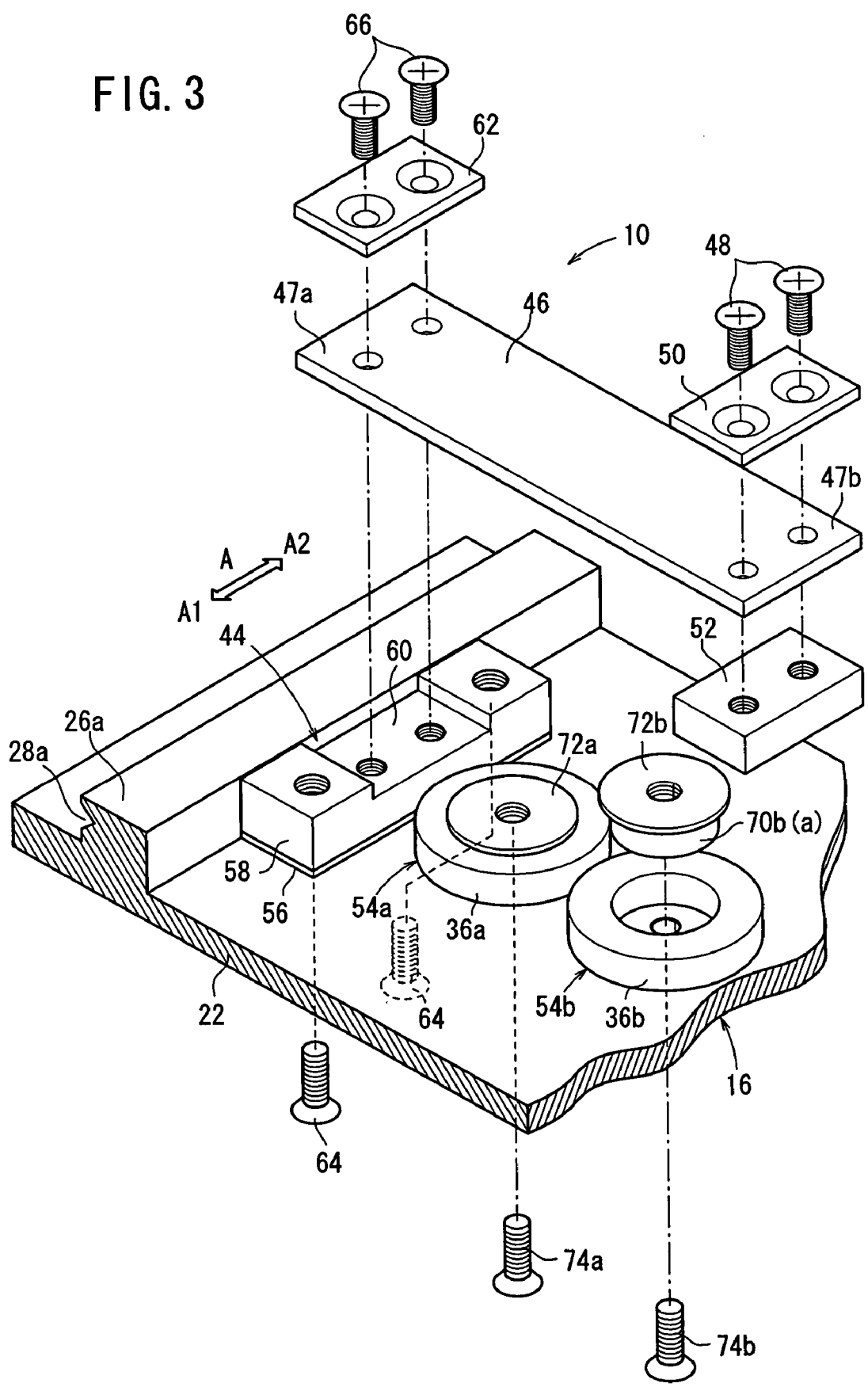
FIG. 3 shows a magnified perspective view illustrating the brake apparatus shown in FIGS. 1 and 2.

Projections 26a, 26b, which protrude from the base toward the movable section 20, are formed on both sides of the guide rail 22. Guide grooves 28a, 28b, which extend in the direction of the arrow A as shown in FIGS. 1 to 3, are formed respectively at outer portions of the projections 26a, 26b. A plurality of balls 30a, 30b, which serve as rolling members, are arranged in the guide grooves 28a, 28b. In this arrangement, both the guide rail 22 and a slide table 32 of the movable section 20 have substantially the same width. Respective projections 26a, 26b of the guide rail 22 are formed inwardly with respect to projections 34a, 34b of the slide table 32 (see FIGS. 4 and 5).

The coil 14 is a hollow core coil including conductive element wires, which are coated with insulating films and molded with an insulating material composed of resin.

An electronic circuit, which is contained within the driving section 24, is electrically connected to element wires of the coil 14 and to element wires of respective coils 36a, 36b making up the brake apparatus 10 respectively. Current is made to flow through the respective element wires on the basis of control signals fed from an unillustrated external apparatus. The driving section 24 also functions as a stopper, which blocks displacement of the slide table 32 in the direction of the arrow A1 when the slide table 32 of the movable section 20 is displaced in the direction of the arrow A1. FIG. 1 shows a state in which the slide table 32 abuts against the driving section 24, in order to stop advancement of the movable section 20 in the direction of the arrow A1.

As shown in FIG. 2, a plurality of screw holes 38 are formed at portions of the guide rail 22 proximate to the driving section 24. The guide rail 22 can be fixed to another member using unillustrated screws, which may be threaded into the respective screw holes 38.

On the other hand, as shown in FIGS. 1 to 5, the movable section 20 includes the slide table 32, which has a substantially U-shaped cross section, and two permanent magnets 18a, 18b, which are arranged in opposition to the coil 14 at substantially central portions on the bottom surface of the slide table 32.

Projections 34a, 34b, which protrude from the base toward the fixed section 16, are formed on both sides of the slide table 32. Guide grooves 40a, 40b, in which balls 30a, 30b may be arranged in the direction of the arrow A, are formed along inner portions of the respective projections 34a, 34b. In this arrangement, the slide table 32 and the guide rail 22 are connected to one another through the balls 30a, 30b (see FIGS. 4 and 5).

That is, in the case of the linear motor 12, the guide rail 22 and the slide table 32 are arranged so that the guide grooves 28a, 28b have substantially the same height as that of the guide grooves 40a, 40b. The plurality of balls 30a, 30b are accommodated as finite length linear guides within clearances formed between the guide grooves 28a, 28b and the guide grooves 40a, 40b. Accordingly, the movable section 20 is displaceable in the direction of the arrow A with respect to the fixed section 16, under a guiding action effected by rotation of the respective balls 30a, 30b.

The permanent magnets 18a, 18b are substantially rectangular and are magnetized in mutually different directions. The permanent magnets 18a, 18b are fixed to the bottom surface of the slide table 32 while being separated from each other by a predetermined distance. For example, with reference to FIGS. 1, 2, 4, and 5, when the permanent magnet 18a is magnetized in an upward direction, the permanent magnet 18b is magnetized in a downward direction. Further, the width of each of the permanent magnets 18a, 18b is set to be narrower than the width of the coil 14.

A plurality of screw holes 42 are formed at respective ends of the slide table 32 in the direction of the arrow A. Another member may be fixed to the slide table 32 through the aid of unillustrated screws which are threaded into the respective screw holes 42.

In the case of the linear motor 12 described above, the guide rail 22 and the slide table 32 both are composed of magnetic members. Spherical members, which make up the balls 30a, 30b, include steel balls composed of magnetic members in addition to spherical members composed of nonmagnetic members. The magnetic steel balls and the nonmagnetic spherical members are alternately arranged in the direction of the arrow A.

As shown in FIGS. 1 to 5, the brake apparatus 10 includes a support section 44 arranged on an upper surface thereof, at an end of the guide rail 22 in the direction of the arrow A2. The support section 44 is arranged on an upper surface of the guide rail 22 while being separated from the movable section 20. A plate spring (elastic member) 46, has a proximal end 47a thereof supported by the support section 44, in the form of a cantilever between the movable section 20 and the fixed section 16. A brake pad 50 and a magnetic flux-passing member 52 are fixed by screws 48 to a forward end 47b of the plate spring 46. Two magnetic flux-generating sections 54a, 54b, which are overlapped by the plate spring 46 when the brake apparatus 10 is viewed from an upper position, are arranged on the upper surface of the guide rail 22 while being separated from the movable section 20.

The support section 44 comprises a height-adjusting shim 56 arranged on the upper surface of the guide rail 22, a spacer 58 having a substantially U-shaped cross section which is arranged on the shim 56, and a plate-shaped washer 62 placed on a proximal end 47a of the plate spring 46, wherein the proximal end 47a of the plate spring 46 is arranged in a recess formed on an upper portion of the spacer 58.

In this arrangement, the shim 56 and the spacer 58 are fixed to the guide rail 22 by screws 64, which are threaded into unillustrated screw holes formed in the guide rail 22 and into respective unillustrated screw holes formed at both ends of the shim 56 and the spacer 58 in the direction of the arrow A. The plate spring 46 is fixed to the support section 44 by screws 66, which are inserted into holes formed at both ends of the washer 62 in the direction of the arrow A, into corresponding holes formed at the proximal end 47a, and into corresponding screw holes formed in the recess 60, wherein the proximal end 47a is arranged in the recess 60 and the washer 62 is placed on the upper surface of the proximal end 47a.

The support section 44 is arranged so that respective side surfaces of the shim 56, the spacer 58, the proximal end 47a of the plate spring 46, and the washer 62, are disposed on one side of the projection 26a, abutting against the projection 26a.

The proximal end 47a of the plate spring 46 is supported by the support section 44 in the form of a cantilever. The plate spring 46 extends from the support section 44 toward the projection 26b along the upper surface of the guide rail 22 and the bottom surface of the slide table 32 (see FIGS. 2, 4, and 5). In this arrangement, the forward end 47b of the plate spring 46 is displaceable toward the movable section 20 about a fulcrum or supporting point of the proximal end 47a, in accordance with the resilient force possessed by the plate spring 46.

The plate-shaped brake pad 50 is arranged on an upper surface at the forward end 47b of the plate spring 46, on a side thereof facing the slide table 32. The block-shaped magnetic flux-passing member 52 is arranged on the bottom surface, on the side of the guide rail 22. The brake pad 50 and the magnetic flux-passing member 52 are fixed to the forward end 47b of the plate spring 46 by screws 48, which are threaded into holes formed at both ends of the brake pad 50 in the direction of the arrow A, into respective holes formed at the forward end 47b of the plate spring 46, and into screw holes formed in the magnetic flux-passing member 52 corresponding to the respective holes.

The upper surface of the brake pad 50 makes surface-to-surface contact and abuts against the bottom surface of the slide table 32 when magnetic flux is not generated by the magnetic flux-generating sections 54a, 54b. That is, in this condition, the brake pad 50 is positioned higher than other elements making up the brake apparatus 10 (see FIG. 4).

As shown in FIGS. 2 to 5, the magnetic flux-generating sections 54a, 54b are arranged on an upper surface of the guide rail 22, between the support section 44 and the magnetic flux-passing member 52. The magnetic flux-generating sections 54a, 54b are constructed as electromagnets, provided with hollow cylindrical coils 36a, 36b which include conductive element wires wound therearound. The magnetic flux-generating sections 54a, 54b further are coated with insulating films and molded with insulating members composed of resin. Iron cores 70a, 70b are inserted inwardly into the coils 36a, 36b.

Flanges 72a, 72b are formed at upper portions of the respective iron cores 70a, 70b and expand radially outward therefrom. When the iron cores 70a, 70b are inserted into the coils 36a, 36b, the flanges 72a, 72b are placed on upper surfaces of the coils 36a, 36b. In this situation, the coils 36a, 36b and the iron cores 70a, 70b are fixed to the guide rail 22 by screws 74a, 74b, which are threaded into screw holes formed in the iron cores 70a, 70b and into screw holes formed in the guide rail 22.

The brake apparatus 10 (see FIGS. 1 to 5) comprises the plate spring 46, the screws 48, 66, 74a, 74b, the magnetic flux-passing member 52, the shim 56, the spacer 58, the washer 62, and the iron cores 70a, 70b, which are composed of magnetic members. As a result, when current flows from the driving section 24 through the element wires of the coils 36a, 36b, a magnetic flux is generated, wherein the magnetic flux passes through the plate spring 46 as a magnetic member, and the magnetic flux additionally passes through the screws 48 and the magnetic flux-passing member 52. Accordingly, an electromagnetic force, which results from the magnetic flux, is exerted against the resilient force of the plate spring 46, and acts on the forward end 47b of the plate spring 46, the screws 48, and the magnetic flux-passing member 52. It is not necessary that all elements of the brake apparatus 10 be composed of magnetic members, as described above. The brake apparatus 10 may also be constructed in the following manner, in which, for example, only the plate spring 46, the screws 48, the magnetic flux-passing member 52, the spacer 58, and the iron cores 70a, 70b are composed of magnetic members, whereby an electromagnetic force acts on the plate spring 46.

Further, the brake pad 50 may be composed of a resin material, an engineering plastic material, or a rubber material. However, preferably, when the brake pad 50 is composed of a cermet material, which has a coefficient of friction, heat resistance and abrasion resistance larger than those of the aforementioned materials, the movable section 20 can be positioned more accurately when the upper surface of the brake pad 50 makes surface-to-surface contact with the bottom surface of the slide table 32, in order to position the movable section 20 at a predetermined position.

The brake apparatus 10 according to the embodiment of the present invention is basically constructed as described above. Next, a braking operation effected by the brake apparatus 10 on the movable section 20 (i.e., an operation for positioning and retaining the movable section 20 with respect to the fixed section 16) shall be explained with reference to FIGS. 1 to 5.

Explanations shall now be made concerning operations for positioning and fixing the movable section 20 using the brake apparatus 10, in relation to a first case (Case 1), in which the movable section 20 is displaced from the position shown in FIG. 1 to a predetermined position in the direction of the arrow A2, and in relation to a second case (Case 2), in which the movable section 20 is displaced from the position shown in FIG. 1 to a predetermined position in the direction of the arrow A2, in a state in which the linear motor 12 is arranged in an upstanding manner. In Case 2, it is assumed that the direction of the arrow A2 is a vertically downward direction.

At first, a positioning operation for the movable section 20, according to Case 1, shall be explained.

Figure 4:
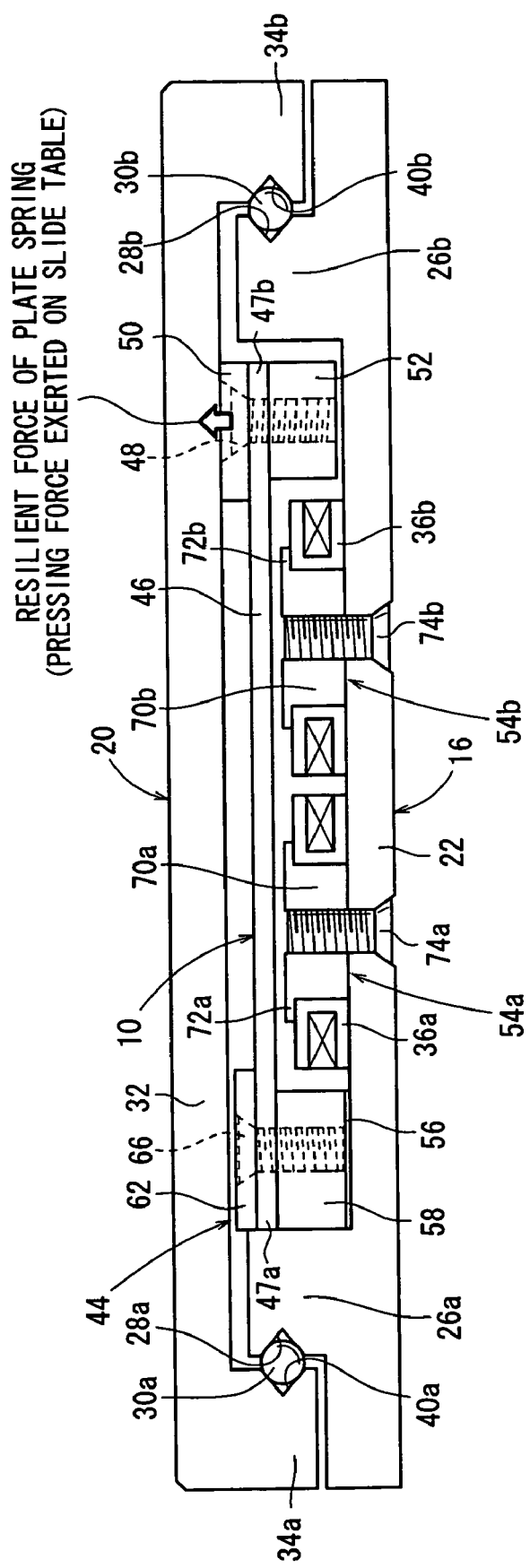
FIG. 4 shows a sectional view taken along line IV-IV shown in FIG. 1.

When electric power is not applied by the driving section 24 to the respective element wires of the coils 36a, 36b, the brake pad 50 presses against the bottom surface of the slide table 32, due to the resilient force of the plate spring 46, as shown in FIG. 4 (i.e., the pressing force is in the direction of the arrow shown in FIG. 4). Therefore, the slide table 32 is fixed and retained at the position shown in FIG. 1. Unillustrated magnetic paths are formed within the linear motor 12 by magnetic fluxes generated from the permanent magnets 18a, 18b.

Figure 5:
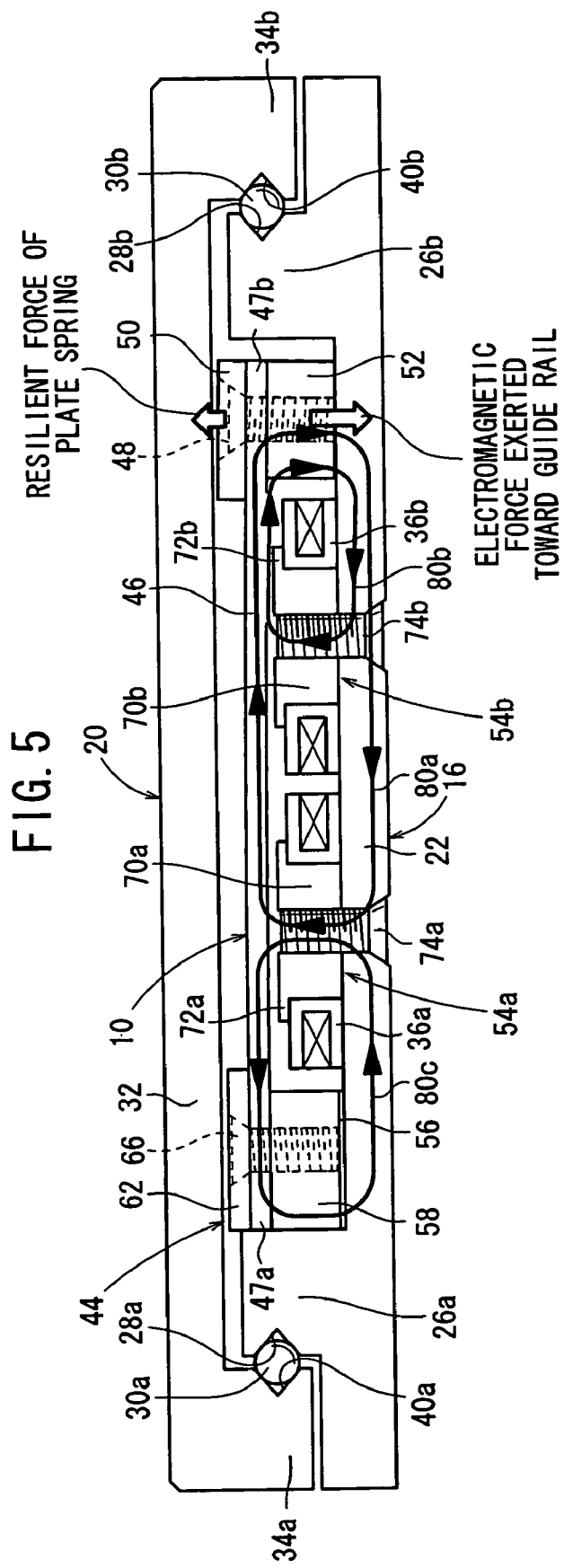
FIG. 5 shows a sectional view taken along line V-V shown in FIG. 1.

Subsequently, when a current is caused to flow from the driving section 24 to respective element wires of the coils 36a, 36b, magnetic paths 80a, 80b, 80c, as shown in FIG. 5, are formed in the linear motor 12 due to magnetic fluxes generated by the current, which flows through the respective element wires of the coils 36a, 36b.

The magnetic path 80a is a magnetic path through which the magnetic flux generated from the coil 36a passes. The magnetic path 80a follows a route which passes through the iron core 70a and screw 74a, a gap between the plate spring 46 and the iron core 70a and screw 74a, the plate spring 46, the screws 48 and magnetic flux-passing member 52, a gap between the guide rail 22 and the screws 48 and magnetic flux-passing member 52, the guide rail 22, and returning to the iron core 70a and screw 74a.

The magnetic path 80b is a magnetic path through which the magnetic flux generated from the coil 36b passes. The magnetic path 80b follows a route which passes through the iron core 70b and screw 74b, a gap between the plate spring 46 and the iron core 70b and screw 74b, the plate spring 46, the screws 48 and magnetic flux-passing member 52, a gap between the guide rail 22 and the screws 48 and magnetic flux-passing member 52, the guide rail 22, and returning to the iron core 70b and screw 74b.

The magnetic path 80c is a magnetic path through which the magnetic flux generated from the coil 36a passes. The magnetic path 80c follows a route which passes through the iron core 70a and screw 74a, a gap between the plate spring 46 and the iron core 70a and screw 74a, the plate spring 46, the screw 66, the spacer 58, and the shim 56, the guide rail 22, and returning to the iron core 70a and screw 74a.

A electromagnetic force, which results from the respective magnetic fluxes passing through the magnetic paths 80a, 80b, 80c as described above, is generated at portions of the plate spring 46 opposed to the iron cores 70a, 70b and magnetic flux-passing member 52. The electromagnetic force is exerted against the resilient force of the plate spring 46 (i.e., the pressing force shown in FIGS. 4 and 5). Further, the electromagnetic force is larger than the resilient force. Therefore, the plate spring 46 and the magnetic flux-passing member 52 are displaced away from the side of the movable section 20 and toward the fixed section 16, in accordance with the action of the electromagnetic force. As a result, the brake pad 50, which is fixed to the forward end 47b by screws 48, separates from the slide table 32 and moves toward the fixed section 16 (first step).

When electric power is applied to the respective element wires of the coil 14, after the brake pad 50 has separated from the slide table 32, thus releasing the movable section 20 from its braked state effected with respect to the fixed section 16, then a thrust force (Lorentz force), in the direction of the arrow A1, is generated on the basis of Fleming's left hand rule within the coil 14, depending on the direction of the current that flows through the element wires of the coil 14 shown in FIGS. 1 and 2, and the directions of magnetic fluxes generated by the current and by the permanent magnets 16a, 16b. When the guide rail 22 of the fixed section 16 is fixed to another member, a thrust force in the direction of the arrow A2, which is based on the thrust force described above, acts relatively on the movable section 20. Therefore, the movable section 20 is displaced in the direction of the arrow A2, under a guiding action effected by the rotation of balls 30a, 30b (second step).

The arrows of the magnetic paths 80a to 80c shown in FIG. 5 indicate exemplary directions, by way of example, wherein respective magnetic fluxes pass through such paths, and the magnetic fluxes are generated when current flows through the element wires of the coils 36a, 36b.

Subsequently, when application of electric power from the driving section 24 to respective element wires of the coils 36a, 36b is halted, after the movable section 20 has been displaced to a predetermined position in the direction of the arrow A2 (see FIGS. 1 and 2), then the coils 36a, 36b stop generating magnetic flux, and the electromagnetic force exerted on the plate spring 46 and the magnetic flux-passing member 52 is extinguished (see FIG. 4). As a result, the plate spring 46 and the magnetic flux-passing member 52, previously having been displaced toward the fixed section 16, are now displaced away from the fixed section 16 and toward the movable section 20, in accordance with the resilient force of the plate spring 46. Accordingly, the brake pad 50 presses against the bottom surface of the slide table 32. Therefore, the slide table 32 is positioned and retained at the predetermined position (third step).

After the slide table 32 has been positioned and retained at the predetermined position by the brake apparatus 10, application of electric power from the driving section 24 to the element wires of the coil 14 is halted (see FIGS. 1 and 2) (fourth step).

In Case 1, after the movable section 20 has been displaced in the direction of the arrow A2 as described above, the movable section 20 may be displaced in the direction of the arrow A1 to reposition the movable section 20 at the position shown in FIG. 1, by causing a current to flow through the respective element wires of the coil 14, in a direction opposite to the current direction described in the second step above, to thereby generate a thrust force directed in the direction of the arrow A1.

Next, in Case 2, the linear motor 12 is arranged in an upstanding manner in the direction of the arrow A. Therefore, if an operation is performed to separate the brake pad 50 from the movable section 20, in the same manner as performed in the first step of Case 1, it is feared that the movable section 20 and an unillustrated workpiece fixed to the movable section 20 may move in the direction of the arrow A2 (i.e., in the vertically downward direction) during a state in which current does not flow through the element wires of the coil 14.

Accordingly, in place of the first step of Case 1, in the first step of Case 2 a current, which is smaller than the current applied in Case 1, is caused to flow from the driving section 24 to respective element wires of the coils 36a, 36b, to thereby generate magnetic paths 80a, 80b, 80c in the linear motor 12 as shown in FIG. 5. Further, an electromagnetic force, which results from the respective magnetic fluxes passing through the respective magnetic paths 80a, 80b, 80c, is generated within the magnetic flux-passing member 52 and portions of the plate spring 46 opposed to the iron cores 70a, 70b.

As a result of the smaller current, the magnitude of the electromagnetic force is smaller than the resilient force of the plate spring 46 (see FIGS. 4 and 5). Therefore, the brake pad 50 does not separate away from the movable section 20 completely, but rather, the pressing force exerted by the brake pad 50 on the movable section 20 is lowered.

Subsequently, when electric power is applied to the respective element wires of the coil 14, in a state in which the pressing force exerted by the brake pad 50 on the movable section 20 is lowered, a thrust force (Lorentz force) in the direction of the arrow A1 is generated in the coil 14 on the basis of Fleming's left hand rule, depending on the direction of the current flowing through the element wires of the coil 14 shown in FIGS. 1 and 2 and the directions of magnetic flux generated by the current and by the magnetic fluxes generated by the permanent magnets 16a, 16b. In this situation, when the fixed section 16 is fixed to another member (not illustrated), the movable section 20 is displaced in the direction of the arrow A2 under a guiding action effected by the rotation of the balls 30a, 30b while the bottom surface of the movable section 20 is maintained in contact with the brake pad 50 (second step).

Subsequently, in the third step of Case 2, after the movable section 20 has been moved and positioned (i.e., allowed to stand still) at a predetermined position in the direction of the arrow A2 (see FIGS. 1 and 2), application of electric power from the driving section 24 to the respective element wires of coils 36a, 36b is halted, whereby the electromagnetic force effected on the plate spring 46 and the magnetic flux-passing member 52 is extinguished, in the same manner as in the third step of Case 1 (see FIG. 4). Accordingly, the brake pad 50 presses firmly against the bottom surface of the slide table 32 due only to the resilient force of the plate spring 46. As a result, the slide table 32 is positioned and retained at the predetermined position.

In the fourth step of Case 2, the slide table 32 is positioned and retained at the predetermined position by means of the brake apparatus 10, and application of electric power from the driving section 24 to the element wires of the coil 14 is halted, in the same manner as in the fourth step of Case 1 (see FIGS. 1 and 2).

The operations of Case 2, as described above, are performed when the linear motor 12 is arranged in an upstanding manner. However, Case 2 is also applicable for positioning the movable section 20 when the linear motor 12 is in a laterally placed state, as shown in FIG. 1, wherein an external force, which is imposed in the direction of arrow A1 or arrow A2, acts on the movable section 20.

In Case 2, the pressing force exerted by the brake pad 50 on the bottom surface of the slide table 32 can be appropriately changed by adjusting the current flowing through the coils 36a, 36b, thereby changing the electromagnetic force, in the first to third steps described above. As a result, the electromagnetic force may also be controlled, for example, such that the brake pad 50 separates from the slide table 32 in the first step or the second step.

In Case 1 and Case 2 described above, an unillustrated displacement sensor, for detecting a displacement amount of the movable section 20 and outputting a detection result to the driving section 24, is arranged on the fixed section 16 or the movable section 20. In the respective steps described above, the driving section 24 calculates a difference between the present position and a target position of the movable section 20 (i.e., the target position at which the movable section 20 is to be positioned and retained) on the basis of the detection result, and changes the direction and/or magnitude of the current that flows through the element wires of the respective coils 14, 36a, 36b on the basis of the calculation result. As a result, the movable section 20 can be positioned and retained at a predetermined position, in accordance with a feedback control based on use of the displacement sensor, the driving section 24, and the coils 14, 36a, 36b.

As described above, in the brake apparatus 10 according to the embodiment of the present invention, when respective magnetic fluxes generated by the coils 36a, 36b making up the magnetic flux-generating sections 54a, 54b pass through the plate spring 46, an electromagnetic force resulting from the respective magnetic fluxes acts on the plate spring 46 and the magnetic flux-passing member 52. Therefore, the brake pad 50 arranged at the forward end 47b separates away from the slide table 32 of the movable section 20, against the resilient force exerted by the plate spring 46. As a result, the movable section 20 can be displaced with respect to the fixed section 16.

On the other hand, when the respective magnetic fluxes of the coils 36a, 36b are lowered or halted, the respective magnetic fluxes passing through the plate spring 46 and the magnetic flux-passing member 52 are lowered or halted as well. Therefore, the electromagnetic force acting on the plate spring 46 and the magnetic flux-passing member 52 is reduced or extinguished. As a result, the brake pad 50 presses against the slide table 32 under the resilient force exerted by the plate spring 46. Therefore, the movable section 20 is positioned and retained with respect to the fixed section 16.

That is, in the case of the brake apparatus 10, the slide table 32 is positioned and retained with respect to the guide rail 22 by means of the resilient force of the plate spring 46, by lowering or extinguishing the electromagnetic force and lowering or halting the respective magnetic fluxes from the coils 36a, 36b. Therefore, compared with a conventional brake apparatus in which the slide table is positioned and retained by means of an electromagnetic force, the present invention enables increases in temperature and generation of heat to be reduced after completion of positioning.

In the case of a conventional linear motor, which is not provided with the brake apparatus 10, electric power applied to the linear motor coil must be continued in order to retain positioning of the movable section, even after the movable section has been positioned with respect to the fixed section. Therefore, it is impossible to suppress generation of heat from the coil. By contrast, in the brake apparatus 10 according to the embodiment of the present invention, the slide table 32 is positioned by means of the resilient force of the plate spring 46, as described above. Therefore, generation of heat by the brake apparatus 10 and the linear motor 12 can be suppressed after completion of positioning.

As described above, the brake apparatus 10 positions and retains the slide table 32 using only the resilient force of the plate spring 46, and without utilizing an electromagnetic force. Therefore, the slide table 32 can be positioned highly accurately.

Further, electromagnetic noise and mechanical vibrations are not generated by the brake apparatus 10 and the linear motor 12 after the completion of positioning, since the slide table 32 is positioned and retained only by means of the resilient force. As a result, the influence of electromagnetic noise and the mechanical vibration on the apparatus assembled with the linear motor 12 and brake apparatus 10 can be avoided.

In the brake apparatus 10, the plate spring 46, which is arranged between the movable section 20 and the fixed section 16 of the linear motor 12, is attached to the fixed section 16 at its proximal end 47a through the aid of a support section 44. When the electromagnetic force is lowered or extinguished, the brake pad 50, which is arranged at the forward end 47b of the plate spring 46, directly presses the slide table 32 to position and retain the slide table 32. Therefore, backlash is small in the displacement direction of the slide table 32 (in the direction of the arrow A), as compared with a conventional brake apparatus. Therefore, the slide table 32 can be positioned highly accurately in a short period of time.

The slide table 32 is pressed by means of surface-to-surface contact using the brake pad 50, and thus the slide table 32 can be positioned more accurately.

The magnetic flux-passing member 52 is fixed to the forward end 47b of the plate spring 46 by means of screws 48. Accordingly, magnetic flux is concentrated in the vicinity of the forward end 47b, and a large electromagnetic force acts on the forward end 47b. As a result, the brake pad 50 can be separated from the slide table 32 with ease. Further, the brake pad 50 can be separated from the slide table 32 using a smaller magnetic flux.

The brake apparatus 10 is arranged between the fixed section 16 and the movable section 20, wherein the movable section 20 is disposed in an opposing fashion to the fixed section 16. Therefore, it is possible to reduce a moment, which acts on the slide table 32 when the slide table 32 is positioned and retained. Thus, the load exerted on the fixed section 16 (i.e., guide rail 22) that retains the brake apparatus 10 is decreased. As a result, durability of the brake apparatus 10 and linear motor 12 can be improved.

In the method for positioning the movable section 20 of the linear motor 12 according to the embodiment of the present invention, in the first step of Case 1, the forward end 47b of the plate spring 46 is separated from the movable section 20 by means of an electromagnetic force, which is exerted against the resilient force of the plate spring 46. In the second step, electric power is applied to respective element wires of the coil 14, whereby the movable section 20 is displaced with respect to the fixed section 16 by means of a thrust force resulting from the magnetic flux generated by the coil 14 and magnetic fluxes generated by the permanent magnets 18a, 18b. Subsequently, in the third step, the electromagnetic force is extinguished, after the movable section 20 has been displaced to its predetermined position, and the forward end 47b of the plate spring 46 is pressed against the slide table 32 by means of the resilient force, in order to position and retain the movable section 20 with respect to the fixed section 16. In the final fourth step, application of the electric power to the coil 14 is stopped.

In this procedure, the slide table 32 is positioned and retained by means of a resilient force. Therefore, in contrast to using an electromagnetic force for positioning and retaining the slide table, the present invention enables increases in temperature and generation of heat to be reduced after completion of positioning.

In the case of a conventional linear motor, which is not provided with a brake apparatus, electric power applied to the linear motor coil must be continued in order to retain positioning of the movable section, even after the movable section has been positioned with respect to the fixed section. Therefore, it is impossible to suppress generation of heat from the coil. By contrast, in the positioning method according to the embodiment of the present invention, the slide table 32 is positioned by means of the resilient force of the plate spring 46, as described above. Therefore, generation of heat by the brake apparatus 10 and the linear motor 12 can be suppressed after completion of positioning.

As described above, the brake apparatus 10 positions and retains the slide table 32 using only the resilient force of the plate spring 46, and without utilizing an electromagnetic force. Therefore, the slide table 32 can be positioned highly accurately.

Further, electromagnetic noise and mechanical vibrations are not generated by the brake apparatus 10 and linear motor 12 after completion of positioning, since the slide table 32 is positioned and retained only by means of the resilient force. As a result, the influence of electromagnetic noise and mechanical vibration on the apparatus assembled with the linear motor 12 and brake apparatus 10 can be avoided.

In the method for positioning the movable section 20 of the linear motor 12 according to the embodiment of the present invention, the movable section 20 is displaced with respect to the fixed section 16, in a state in which the pressing force of the brake pad 50 exerted on the slide table 32 is reduced. Therefore, when the slide table 32 is displaced in the vertical direction, in a state in which the linear motor 12 is disposed in an upstanding manner and the workpiece is fixed to the slide table 32, it is possible to prevent the workpiece from falling downward. When the slide table 32 is pressed by the brake pad 50 until the thrust force acts on the slide table 32, the slide table 32 and the workpiece can reliably be prevented from falling downward.

Figure 6:
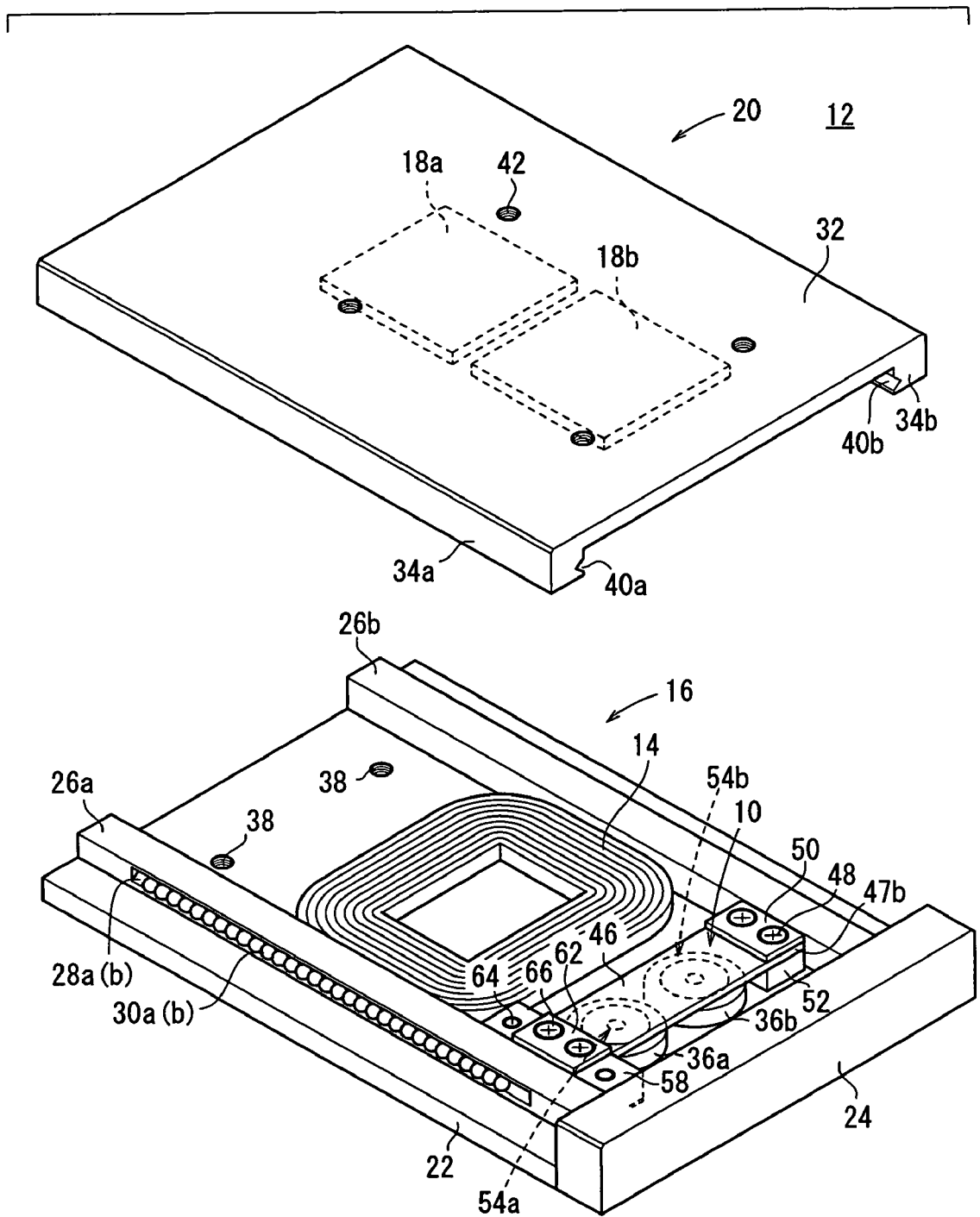
FIG. 6 shows a perspective view illustrating a linear motor provided with a brake apparatus arranged at an end of a guide rail in the direction of arrow A1.

The above embodiment illustrates a case in which the brake apparatus 10 is arranged on an upper surface of the guide rail 22 at one end thereof in the direction of the arrow A2. However, in place of this arrangement, it is a matter of course that the same functions and effects as described above may be obtained, even when the brake apparatus 10 is arranged on the upper surface at the other end thereof in the direction of the arrow A1, as shown in FIG. 6, and wherein the screw holes 38 are formed at the end thereof in the direction of the arrow A2.

The above embodiment illustrates a case in which the plate spring 46 is arranged in a direction perpendicular to the direction of the arrow A. However, it is a matter of course that the same functions and effects as described above may be obtained, even when the plate spring 46 is arranged in the same direction as the direction of arrow A.

The above embodiment illustrates a case of the linear motor 12 in which the coil 14 is arranged on the fixed section 16, and permanent magnets 18*a*, 18*b* are arranged on the movable section 20. However, it is a matter of course that the same functions and effects as described above may be obtained, even in cases where the brake apparatus 10 is arranged on a fixed section of a linear motor, which is constructed differently from the linear motor 12 described above.

The brake apparatus for the linear motor, and the method of positioning the movable section of the linear motor according to the present invention, are not limited to the embodiments described above. Rather, the present invention may be embodied in other various forms without deviating from the gist or essential characteristics thereof.

What is claimed is:

1. A brake apparatus for a linear motor, for positioning a movable section of said linear motor with respect to a fixed section of said linear motor, said brake apparatus comprising:

a support section disposed on said fixed section and separated from said movable section;

an elastic member composed of a magnetic member and having a proximal end supported by said support section in the form of a cantilever and a forward end capable of pressing said movable section by means of a resilient force exerted about a fulcrum of said proximal end;

a magnetic flux-generating section disposed on said fixed section and separated from said movable section, said elastic member overlapping said magnetic flux-generating section; and a magnetic flux-passing member composed of a magnetic member disposed at said forward end of said elastic member opposing said fixed section, said fixed section also being composed of a magnetic member, wherein said forward end of said elastic member is capable of separating away from said movable section against said resilient force in accordance with an electromagnetic force caused by a magnetic flux generated by said magnetic flux-generating section that passes through said elastic member, wherein said forward end of said elastic member presses against said movable section by means of said resilient force to position said movable section with respect to said fixed section when said electromagnetic force is lowered or extinguished, by reducing or stopping said magnetic flux generated by said magnetic flux-generating section, and wherein a magnetic path of said magnetic flux passes through said magnetic flux-generating section, said elastic member, said magnetic flux-passing member, and said fixed section when said magnetic flux is generated by said magnetic flux-generating section.

2. The brake apparatus for said linear motor according to claim 1, further comprising:

a brake pad disposed at said forward end of said elastic member so that said brake pad makes surface-to-surface contact with said movable section, wherein said brake pad is capable of separating away from said movable section against said resilient force by means of said electromagnetic force when said magnetic flux passes through said elastic member, and wherein said brake pad presses against said movable section in surface-to-surface contact therewith by means of said resilient force, to thereby position said movable section with respect to said fixed section, when said electromagnetic force is lowered or extinguished.

3. The brake apparatus for said linear motor according to claim 2, wherein said brake pad is composed of a resin material, an engineering plastic material, a rubber material, or a cermet material.

4. The brake apparatus for said linear motor according to claim 1, wherein said elastic member comprises a plate spring.

5. The brake apparatus for said linear motor according to claim 1, wherein said magnetic flux-generating section comprises an electromagnet.

6. The brake apparatus for said linear motor according to claim 1, wherein said brake apparatus is disposed between said fixed section and said movable section, and said movable section is arranged so as to oppose said fixed section.

7. The brake apparatus for said linear motor according to claim 1, wherein:

said support section comprises a height-adjusting shim arranged on a surface of said fixed section, a spacer arranged on said shim, and a washer arranged over said spacer, with said proximal end of said elastic member intervening between said spacer and said washer;

said shim and said spacer are fixed to said fixed section by means of a screw; and said proximal end of said elastic member and said washer are fixed to said spacer by means of a screw.

8. The brake apparatus for said linear motor according to claim 1, wherein said brake apparatus is arranged at one end or another end of said fixed section in a displacement direction of said movable section.

9. A method for positioning a movable section of a linear motor with respect to a fixed section of said linear motor using a brake apparatus, said brake apparatus including a support section disposed on said fixed section and separated from said movable section, an elastic member composed of a magnetic member and having a proximal end supported by said support section in the form of a cantilever and a forward end capable of pressing said movable section by means of a resilient force exerted about a fulcrum of said proximal end, a magnetic flux-generating section disposed on said fixed section and separated from said movable section, said elastic member overlapping said magnetic flux-generating section when viewed from above, and a magnetic flux-passing member composed of a magnetic member disposed at said forward end of said elastic member opposing said fixed section, said fixed section also being composed of a magnetic member, wherein said method comprises:

a first step of separating said forward end of said elastic member from said movable section by means of an electromagnetic force resulting from a magnetic flux generated by said magnetic flux-generating section, wherein said magnetic flux passes through said elastic member in a state in which said forward end of said elastic member presses against said movable section, and wherein a magnetic path of said magnetic flux passes through said magnetic flux-generating section, said elastic member, said magnetic flux-passing member, and said fixed section when said magnetic flux is generated by said magnetic flux-generating section;

a second step of displacing said movable section with respect to said fixed section in a state in which said forward end of said elastic member is separated from said movable section;

a third step of pressing said forward end of said elastic member against said movable section by means of said resilient force, to thereby position said movable section with respect to said fixed section by halting generation of said magnetic flux from said magnetic flux-generating section and extinguishing said electromagnetic force, when said movable section is displaced to a predetermined position; and a fourth step of stopping displacement of said movable section with respect to said fixed section, in a state in which said movable section is positioned by said forward end of said elastic member.

10. A method for positioning a movable section of a linear motor with respect to a fixed section of said linear motor using a brake apparatus, said brake apparatus including a support section disposed on said fixed section and separated from said movable section, an elastic member composed of a magnetic member and having a proximal end supported by said support section in the form of a cantilever and a forward end capable of pressing said movable section by means of a resilient force exerted about a fulcrum of said proximal end, a magnetic flux-generating section disposed on said fixed section and separated from said movable section, said elastic member overlapping said magnetic flux-generating section when viewed from above, and a magnetic flux-passing member composed of a magnetic member disposed at said forward end of said elastic member opposing said fixed section, said fixed section also being composed of a magnetic member, wherein said method comprises:

a first step of reducing a pressing force exerted on said movable section by said forward end of said elastic member by means of an electromagnetic force resulting from a magnetic flux generated by said magnetic flux-generating section, wherein said magnetic flux passes through said elastic member in a state in which said forward end of said elastic member presses against said movable section, and wherein a magnetic path of said magnetic flux passes through said magnetic flux-generating section, said elastic member, said magnetic flux-passing member, and said fixed section when said magnetic flux is generated by said magnetic flux-generating section;

a second step of displacing said movable section with respect to said fixed section in a state in which said pressing force is reduced;

a third step of increasing said pressing force exerted by said resilient force on said forward end of said elastic member, to thereby position said movable section with respect to said fixed section by halting generation of said magnetic flux by said magnetic flux-generating section and extinguishing said electromagnetic force, when said movable section is displaced to a predetermined position; and a fourth step of stopping displacement of said movable section with respect to said fixed section, in a state in which said movable section is positioned by said forward end of said elastic member.

11. The method for positioning said movable section of said linear motor according to claim 10, wherein, in said first to third steps, said magnetic flux-generating section controls a magnitude of said electromagnetic force by adjusting a magnitude of said magnetic flux.

12. The method for positioning said movable section of said linear motor according to claim 10, wherein said movable section is displaced with respect to said fixed section in a state in which said linear motor is disposed in an upstanding manner.

* * * * *

UNITED STATES PATENT AND TRADEMARK OFFICE
CERTIFICATE OF CORRECTION

| | | |
|---|---|---|
| PATENT NO. | : 7,770,700 B2 | Page 1 of 1 |
| APPLICATION NO. | : 11/362173 | |
| DATED | : August 10, 2010 | |
| INVENTOR(S) | : Hisashi Yajima et al. | |

It is certified that error appears in the above-identified patent and that said Letters Patent is hereby corrected as shown below:

Title Page item (75),
A misspelling of the inventor name, Nobohiro Fujiwara, is corrected to --Nobuhiro Fujiwara--.

Signed and Sealed this
Eighteenth Day of January, 2011

David J. Kappos
*Director of the United States Patent and Trademark Office*